United States Patent
Kanbe et al.

(10) Patent No.: US 8,582,416 B2
(45) Date of Patent: *Nov. 12, 2013

(54) HEAT-ASSISTED MAGNETIC RECORDING MEDIUM AND MAGNETIC RECORDING AND READING APPARATUS

(71) Applicant: Showa Denko K.K., Tokyo (JP)

(72) Inventors: Tetsuya Kanbe, Ichihara (JP); Atsushi Hashimoto, Chiba (JP); Takayuki Fukushima, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/749,934

(22) Filed: Jan. 25, 2013

(65) Prior Publication Data

US 2013/0194901 A1    Aug. 1, 2013

(30) Foreign Application Priority Data

Jan. 31, 2012   (JP) .................................. 2012-019185

(51) Int. Cl.
*G11B 3/70* (2006.01)

(52) U.S. Cl.
USPC ...... 369/288; 369/13.24; 428/832; 428/828.1

(58) Field of Classification Search
USPC .......... 369/286, 288, 13.24, 13.32, 280, 283; 428/832, 828.1, 836.1
See application file for complete search history.

(56) References Cited

U.S. PATENT DOCUMENTS

| | | | |
|---|---|---|---|
| 6,846,583 B2 * | 1/2005 | Inaba et al. | 428/831 |
| 7,186,471 B2 * | 3/2007 | Lu et al. | 428/836.1 |
| 7,521,137 B2 * | 4/2009 | Hohlfeld et al. | 428/831.2 |
| 8,270,286 B2 * | 9/2012 | Kanbe et al. | 369/288 |
| 8,279,739 B2 * | 10/2012 | Kanbe et al. | 369/288 |
| 2012/0207003 A1 * | 8/2012 | Kanbe et al. | 369/13.33 |

* cited by examiner

*Primary Examiner* — Ali Neyzari
(74) *Attorney, Agent, or Firm* — Sughrue Mion, PLLC

(57) ABSTRACT

The heat-assisted magnetic recording medium of the present invention has a substrate, an under layer formed on the substrate, and a magnetic layer formed on the under layer, in which the magnetic layer includes an alloy having a $L1_0$ structure as a principle component, and the under layer is constituted by a first under layer made of an amorphous alloy or an alloy having a microcrystalline structure, a second under layer made of Cr or an alloy which contains Cr as a principle component and has a BCC structure, a third under layer made of a metal or an alloy having a BCC structure with a lattice constant of 2.98 Å or more, and a fourth under layer made of MgO.

13 Claims, 4 Drawing Sheets

_US 8,582,416 B2_

HEAT-ASSISTED MAGNETIC RECORDING MEDIUM AND MAGNETIC RECORDING AND READING APPARATUS

BACKGROUND OF THE INVENTION

1. Field of the Invention

The present invention relates to a heat-assisted magnetic recording medium used in hard disk drives (HDD) and the like, and a magnetic recording and reading apparatus using the same.

Priority is claimed on Japanese Patent Application No. 2012-019185, filed on Jan. 31, 2012, the content of which is incorporated herein by reference.

2. Description of Related Art

In recent years, heat-assisted recording in which near-field light or the like is radiated to a magnetic recording medium so as to locally heat the surface and decrease the coercive force of the magnetic recording medium, thereby performing writing has been attracting attention as a next-generation recording method in which a 1 Tbit/inch$^2$ class of surface recording density can be realized.

In a case in which the heat-assisted recording is used, it is possible to readily perform writing using a recording field of a current head even in a magnetic recording medium having a coercive force of several tens of kOe at room temperature. Therefore, in a heat-assisted magnetic recording medium, it becomes possible to use a material having a high crystal magnetic anisotropy (Ku) at a level of $10^6$ J/m$^3$ for a magnetic layer, and it is possible to miniaturize the diameter of magnetic grains to 6 nm or less while maintaining thermal stability. Known examples of the high Ku material include a FePt alloy having a $L1_0$-type crystal structure (Ku: approximately $7\times10^6$ J/m$^3$), a CoPt alloy having a $L1_0$-type crystal structure (Ku: approximately $5\times10^6$ J/m$^3$), and the like.

However, in order to order a FePt alloy so as to obtain an $L1_0$ structure, it is necessary to increase the substrate temperature to 600° C. or higher. However, the substrate temperature is desirably set to approximately 600° C. or less from the viewpoint of the heat resistance of a glass substrate. The ordering temperature can be decreased by adding a third element to FePt. For example, Appl. Phys. Lett. 80, 2147 (2002) describes that the ordering temperature can be significantly decreased by adding Cu to FePt. In addition, J. Appl. Phys. 92, 6104 (2002) describes that the ordering temperature can be decreased by adding Ag and Au in addition to Cu.

SUMMARY OF THE INVENTION

As described above, in order to order a FePt alloy or a CoPt alloy, which is used in a heat-assisted magnetic recording medium, so as to obtain an $L1_0$ structure, it is necessary to heat a substrate to 600° C. or higher. In addition, the ordering temperature can be decreased by adding a third element, such as Cu, Ag, or Au, to a FePt alloy.

However, in this case, a decrease in Ku is caused. Furthermore, in a case in which the third element is added, the coercive force dispersion ΔHc/Hc increases depending on the concentration distribution of the third element. Therefore, it is necessary to decrease the ordering temperature to 600° C. or lower, which is the heat resistance temperature of a glass substrate, without adding the third element to a FePt alloy or a CoPt alloy.

In addition, in a case in which a FePt alloy or a CoPt alloy is used for the magnetic layer in a heat-assisted magnetic recording medium, it is necessary to form a $L1_0$ structure having a high degree of order and make the (001) plane oriented in parallel with the substrate plane in the alloy film.

In order to make the FePt alloy (001)-oriented, it is desirable to form the FePt alloy on a (100)-oriented MgO under layer. It is known that, generally, MgO is (100)-oriented when directly formed on a glass substrate or formed on an under layer of Ta or the like.

However, the thickness of the MgO under layer is preferably set to 10 nm or more in order to realize a favorable (100) orientation, but the thickness of the MgO under layer is 5 nm or less and desirably 3 nm or less from the viewpoint of production efficiency. Furthermore, the MgO under layer is desirably thin from the viewpoint of particle generation suppression. Therefore, it has been necessary to form a MgO under layer which has a thickness of 3 nm or less and exhibits a favorable (100) orientation.

The present invention has been proposed in consideration of the above circumstances of the related art, and an object of the invention is to provide a heat-assisted magnetic recording medium which has a low ordering temperature and enables the film thickness of the MgO under layer to be decreased to 5 nm or less, and a magnetic recording and reading apparatus having the heat-assisted magnetic recording medium.

The invention provides the following means.

(1) A heat-assisted magnetic recording medium having
  a substrate,
  an under layer formed on the substrate, and
  a magnetic layer formed on the under layer,
  in which the magnetic layer includes an alloy having a $L1_0$ structure as a principle component, and
  the under layer is constituted by a first under layer made of an amorphous alloy or an alloy having a microcrystalline structure, a second under layer made of Cr or an alloy which contains Cr as a principle component and has a BCC structure, a third under layer made of a metal or an alloy having a BCC structure with a lattice constant of 2.98 Å or more, and a fourth under layer made of MgO.

(2) The heat-assisted magnetic recording medium according to the above (1), in which the first under layer is made of a NiTa alloy, a NiTi alloy, a CoTa alloy, a CoTi alloy, a CrTa alloy, a CrTi alloy, a CoCrZr alloy, or a CoCrTa alloy which is non-magnetic or is magnetized at 100 emu/cc or less.

(3) The heat-assisted magnetic recording medium according to the above (1), in which the second under layer is made of an alloy which contains Cr as a principle component and contains at least one element selected from Ti, V, Mo, W, Ru, and Mn.

(4) The heat-assisted magnetic recording medium according to the above (1), in which the second under layer is made of an alloy which contains Cr as a principle component, contains at least one element selected from Ti, V, Mo, W, Ru, and Mn, and contains at least one element selected from B, Si, and C.

(5) The heat-assisted magnetic recording medium according to the above (1), in which the lattice constant of the second under layer is 2.98 Å or less.

(6) The heat-assisted magnetic recording medium according to the above (1), in which the third under layer is made of an alloy which contains at least one element selected from V, Mo, W, Ta, and Nb.

(7) The heat-assisted magnetic recording medium according to the above (1), in which the third under layer is made of an alloy which contains at least one element selected from V, Mo, W, Ta, and Nb, and contains at least one element selected from Cr, Mn, Ru, and Ti.

(8) The heat-assisted magnetic recording medium according to the above (1), in which the third layer is made of a metal of Mo or W.

(9) The heat-assisted magnetic recording medium according to the above (1), in which the lattice constant of the third under layer is larger than the lattice constant of the second under layer.

(10) The heat-assisted magnetic recording medium according to the above (1), in which an under layer made of a soft magnetic alloy which contains Co or Fe as a principle component and contains at least one selected from Ta, B, Si, Zr, Al, and C is formed between the first under layer and the second under layer, or is formed between the substrate and the first under layer.

(11) The heat-assisted magnetic recording medium according to the above (1), in which the magnetic layer is made of an alloy which contains a FePt alloy or a CoPt alloy having a $L1_0$ structure as a principle component and contains at least one oxide selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO and C or a chemical element.

(12) The heat-assisted magnetic recording medium according to the above (1), having a cap layer formed on the magnetic layer, in which the cap layer is made of an alloy which contains Co, Ni, or Fe as a principle component and has a lower magnetic anisotropy than the magnetic layer.

(13) A magnetic recording and reading apparatus having the heat-assisted magnetic recording medium according to the above (1), a medium driving portion that drives the heat-assisted magnetic recording medium in a recording direction, a magnetic head which has a laser generation portion that heats the heat-assisted magnetic recording medium and a waveguide that guides laser light generated from the laser generation portion to a front end portion, and performs a recording operation and a reading operation on the heat-assisted magnetic recording medium, a head moving portion that moves the magnetic head relative to the heat-assisted magnetic recording medium, and a recording and reading signal processing system for performing signal input into the magnetic head and reading of an output signal from the magnetic head.

According to the heat-assisted magnetic recording medium of the invention, a heat-assisted recording medium which has a low ordering temperature and decreases the film thickness of the MgO under layer (the fourth under layer) to 5 nm or less can be realized. Therefore, it becomes possible to provide a high-capacity magnetic recording and reading apparatus by applying the heat-assisted magnetic recording medium.

DETAILED DESCRIPTION OF THE INVENTION

Figure 1:
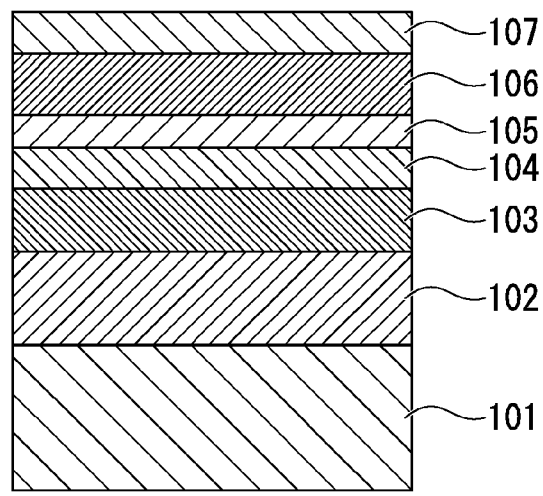
FIG. 1 is a cross-sectional view showing an example of the layer structure of a heat-assisted magnetic recording medium manufactured in a first example.

Hereinafter, preferable examples of a heat-assisted magnetic recording medium and a magnetic recording and reading apparatus according to the invention will be described in detail with reference to the accompanying drawings, but the invention is not limited to these examples. Addition, removal, substitution, and other modifications are permitted within the scope of the purport of the invention.

In addition, in the following description, there are drawings in which characteristic portions are enlarged for convenience in order to facilitate understanding of the characteristics of the invention, and therefore not all the dimensional ratios and the like of the respective components are the same as in an actual heat-assisted magnetic recording medium or an actual magnetic recording and reading apparatus.

A heat-assisted magnetic recording medium to which the invention is applied has a substrate, an under layer formed on the substrate, and a magnetic layer formed on the under layer, in which the magnetic layer includes an alloy having a $L1_0$ structure as a principle component, and the under layer is constituted by a first under layer made of an amorphous alloy or an alloy having a microcrystalline structure, a second under layer made of Cr or an alloy which contains Cr as a principle component and has a BCC structure, a third under layer made of a metal or an alloy having a BCC structure with a lattice constant of 2.98 Å or more, and a fourth under layer made of MgO.

When the heat-assisted magnetic recording medium of the invention is manufactured, firstly, the first under layer made of an amorphous alloy or an alloy having a microstructure is formed on the substrate, and then the substrate is heated to 150° C. or higher. The second under layer can be (100)-oriented by forming the second under layer made of Cr or an alloy which contains Cr as a principle component and has a BCC structure on the first under layer.

The first under layer is not particularly limited as long as the first under layer is made of an amorphous alloy or an alloy having a microcrystalline structure, and, for example, it is possible to use a NiTa alloy, a NiTi alloy, a CoTa alloy, a CoTi alloy, a CrTa alloy, a CrTi alloy, a CoCrZr alloy, a CoCrTa alloy, or the like. In addition, the first under layer is desirably non-magnetic, but the first foundation may be slightly magnetized within a range of 100 emu/cc or less. Therefore, in the alloys containing a magnetic element such as Ni or Co, the content is preferably set to 70 at % or less, and more preferably 60 at % or less.

For the second under layer, it is possible to use Cr or an alloy which contains Cr as a principle component and contains at least one element selected from Ti, V, Mo, W, Ru, and Mn, for example, a Cr alloy such as CrTi, CrV, CrMo, CrW, CrRu, or CrMn.

Furthermore, for the second under layer, a material obtained by adding elements such as B, C, and Si to the above Cr alloy may be used. The grain diameter of the second under layer can be miniaturized by adding the above elements. In addition, addition of the above elements to the second under layer can miniaturize the grain diameters of the third under layer and the fourth under layer, which are formed on the second under layer, and, ultimately, can make the grain diameter of the magnetic layer formed on the under layer uniform.

The amount of the above elements added to the Cr alloy is not particularly limited within a range in which the Cr alloy can have a BCC structure, but addition of a large amount deteriorates the (100) orientation of the second under layer, which is not desirable. Therefore, the total of the elements added to the second under layer is desirably approximately 40 at % or less.

In the invention, when the MgO under layer is formed on the second under layer, it is possible to make the MgO under layer be (100)-oriented. In addition, when a FePt alloy or a CoPt alloy (the magnetic layer) is formed on the (100)-oriented MgO under layer, it is possible to form a $L1_0$ structure in which the above alloy is (001)-oriented.

However, in this case, it is necessary to heat the substrate to 600° C. or higher. As a result of thorough studies regarding a variety of configurations of the under layer, the present inventors found that, when the third under layer made of a BCC alloy having a lattice constant of 2.98 Å or more is formed on the second under layer, and the MgO under layer (the fourth under layer) is formed on the third under layer, the degree of order can be decreased.

Thereby, it becomes possible to obtain a heat-assisted magnetic recording medium having a high coercive force by heating the substrate at 600° C. or lower. The reasons why the ordering temperature can be decreased are considered to be as follows.

That is, the FePt alloy or the CoPt alloy having a $L1_0$ structure has a FCT structure which is compressed in the vertical direction to the film surface. In this case, a tensile stress is introduced in the parallel direction to the film surface so that ordering is accelerated, and the ordering temperature can be decreased. The lattice constant of the MgO under layer is approximately 10% larger than the length of the axis of the $L1_0$-FePt alloy or the $L1_0$-CoPt alloy. Therefore, in a case in which the $L1_0$-FePt alloy or the $L1_0$-CoPt alloy grows epitaxially on the MgO under layer, a tensile stress is introduced in the parallel direction to the film surface in the alloy. As in the present invention, in a case in which the fourth under layer made of MgO grows epitaxially on the third under layer having a BCC structure for which $\sqrt{2}$ times the value of the lattice constant is larger than the lattice constant of MgO, it is possible to expand the lattice constant of MgO in the parallel direction to the film surface. Thereby, it is possible to further increase the in-plane tensile stress which is added to the FePt alloy or the CoPt alloy. Therefore, ordering of the FePt alloy or the CoPt alloy is accelerated, and it becomes possible to decrease the ordering temperature.

The third under layer is not particularly limited as long as the third under layer is a metal or an alloy having a BCC structure with a lattice constant of 2.98 Å or more. In a case in which MgO grows epitaxially so as to be (100)-oriented on the BCC (100)-oriented third under layer (UL3), an orientation relationship of UL3<110>//MgO<100> is established in the in-plane direction. Therefore, when the lattice constant ($a_3$) of the third under layer is 2.98 Å or more, $\sqrt{2}a_3$ becomes 4.23 Å or more so as to be greater than the lattice constant of MgO.

Due to the above, a tensile stress is introduced in the parallel direction to the film surface of MgO, and it is possible to increase the lattice constant. In addition, due to the above, a tensile stress is introduced in the parallel direction to the film surface of the FePt alloy or the CoPt alloy, and ordering can be accelerated.

The upper limit of the lattice constant of the third under layer is not particularly limited; however, since it is necessary to make the third under layer grow epitaxially on the second under layer so as to be (100)-oriented, the upper limit is desirably set in a range in which the lattice mismatch with an alloy used for the second under layer is below approximately 10%. For the third under layer, it is possible to use an alloy containing at least one element selected from V, Mo, W, Ta, and Nb, specifically, VCr, VTi, MoCr, MoTi, MoV, MoMn, MoRu, MoW, MoTa, MoNb, WCr, WTi, WV, WMn, WRu, WTa, WNb, TaCr, TaTi, TaZr, TaNb, NbCr, NbTi, NbZr, or the like. In addition, V, Mo, W, Ta, and Nb may be used singly.

In addition, a possibility can be considered that, when a Cr alloy having a lattice constant ($a_3$) of 2.98 Å or more is used for the second under layer, it is possible to introduce a tensile stress in MgO without providing the third under layer. However, this is difficult to realize. That is, in order to obtain a lattice constant of 2.98 Å or more by adding other elements to Cr, it is necessary to set the amount of the elements added to approximately 40 at %; however, in this case, the crystallinity and orientation of the second under layer significantly deteriorate. Therefore, it is difficult to introduce a tensile stress in MgO without providing the third under layer.

When the fourth under layer made of MgO is formed on the third under layer, it is possible to make the thickness of the MgO as thin as 5 nm or less without deteriorating the orientation and crystallinity of the MgO. Thereby, it is possible to obtain a heat-assisted magnetic recording medium in which the film thickness of MgO is 5 nm or less, and the ordering temperature is 600° C. or lower.

For the magnetic layer, a FePt alloy or a CoPt alloy having a $L1_0$ structure can be used. The magnetic layer preferably has a granular structure in which the FePt alloy or the CoPt alloy is surrounded by a grain boundary segregation material. Examples of the grain boundary segregation material include $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, and mixtures thereof.

A cap layer may be provided on the magnetic layer. In this case, it is possible to introduce exchange couplings between particles in the magnetic layer through the cap layer and decrease the coercive force dispersion. However, since excess exchange couplings increase the size of clusters, it is necessary to set the saturation magnetization (Ms) and film thickness of the cap layer in consideration of the above fact. In addition, Ku of the cap layer is desirably set to be lower than that of the magnetic layer. Thereby, it is possible to facilitate magnetization reversal and improve writing characteristics.

In the invention, in addition to the above, a heat sink layer may be formed using an alloy material which contains Cu, Ag, Al, or a combination thereof as a principle component and has a high heat conductivity. The heat sink layer is preferably provided between the first under layer and the substrate.

In addition, in order to improve writing characteristics, a soft magnetic under layer which contains Co or Fe as a principle component and has an amorphous or microcrystalline structure may be provided. For the soft magnetic under layer, it is possible to use a soft magnetic alloy which contains Co or Fe as a principle component and contains at least one selected from Ta, B, Si, Zr, Al, and C, for example, a CoTaZr alloy, a CoNbZr alloy, a CoFeTaZr alloy, a CoFeTaB alloy, a CoFeTaSi alloy, a CoFeZrSi alloy, a CoFeZrB alloy, a FeAlSi alloy, a FeTaC alloy, or the like. Furthermore, the soft magnetic under layer may be a single layer structure of the above alloy or a laminate structure antiferromagnetically coupled with Ru therebetween.

Since the soft magnetic under layer having an amorphous or microcrystalline structure has a function of making the second under layer (100)-oriented, it is possible to provide the soft magnetic under layer between the first under layer and the second under layer. In addition, the soft magnetic under layer may be provided between the first under layer and the substrate. Furthermore, in the invention, other than the above respective layers, an adhesion layer may be formed on the substrate in order to improve the adhesiveness with the substrate.

EXAMPLES

Hereinafter, the effect of the invention will be described more evidently using examples. In addition, the invention is not limited to the following examples, and can be appropriately modified and carried out within the scope of the purport of the invention.

First Example

FIG. 1 shows an example of the layer structure of a heat-assisted magnetic recording medium manufactured in the first example (hereinafter referred to as the example medium).

When the example medium was manufactured, a 100 nm-thick first under layer 102 made of Ni-38 at % Ta, a 10 nm-thick second under layer 103 made of Cr-15 at % Ti-5 at % B, a 10 nm-thick third under layer 104 made of Mo-40 at % Cr (Example 1-1), Mo-20 at % Cr (Example 1-2), or Mo (Example 1-3), a 2 nm-thick fourth under layer 105 made of MgO, a 10 nm-thick magnetic layer 106 made of (Fe-55 at % Pt)-40 at % C, and a 3 nm-thick protective layer 107 made of carbon (C) were sequentially laminated and formed on a glass substrate 101. In addition, the substrate is heated twice after formation of the first under layer 102 and after formation of the fourth under layer 105, and the heating temperatures are 150° C. and 500° C., respectively. In addition, as Comparative example 1, a heat-assisted magnetic recording medium (hereinafter referred to as the comparative example medium) was manufactured by directly forming the fourth under layer (MgO) 105 on the second under layer (Cr) 103 without forming the third under layer 104.

Figure 2:
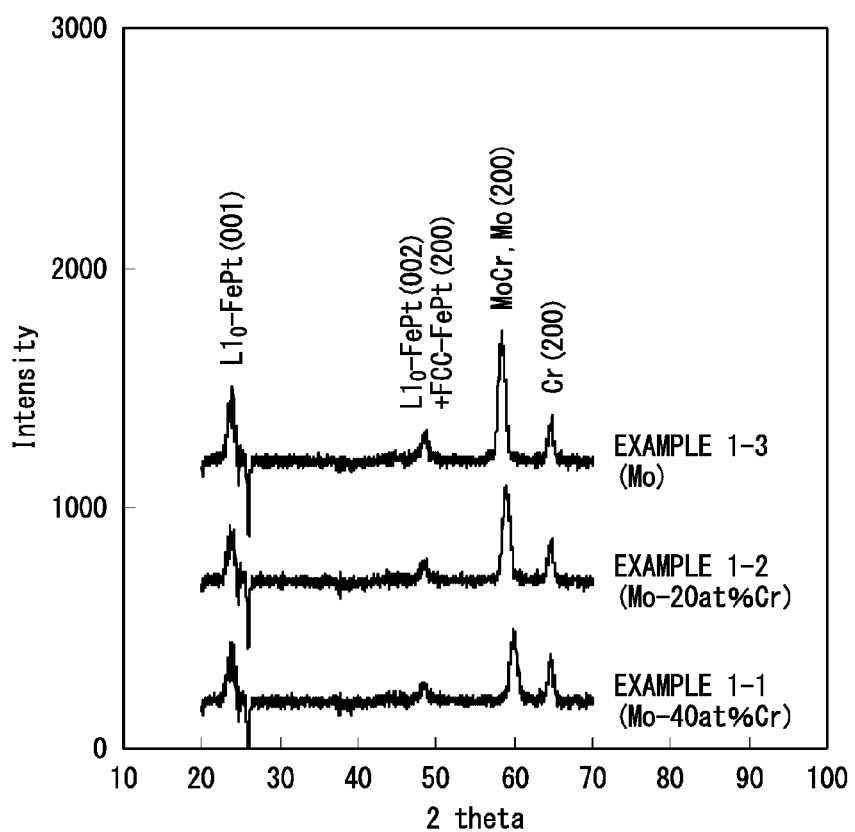
FIG. 2 is a graph showing X-ray diffraction spectra of the heat-assisted magnetic recording media manufactured in a first example.

The X-ray diffraction spectra of the example media (Examples 1-1 to 1-3) are shown in FIG. 2.

As shown in FIG. 2, a (200) peak from Cr used as the second under layer 103 and a (200) peak from MoCr or Mo used as the third under layer 104 can be confirmed. The above fact shows that the second under layer (Cr) 103 formed on the first under layer (NiTa) 102 is (100)-oriented, and the third under layer (CrMo or Mo) 104 grows epitaxially. In addition, there was no clear diffraction peak observed from the first under layer (NiTa) 102. Therefore, the first under layer 102 is considered to have an amorphous structure or a microcrystalline structure.

The lattice constants $a_3$ and the values of $\sqrt{2}a_3$ of the MoCr alloy or Mo used for the third under layers 104 of the examples media (Examples 1-1 to 1-3) are shown in Table 1.

TABLE 1

|  | Third under layer | $a_3$ (Å) | $\sqrt{2}a_3$ (Å) |
| --- | --- | --- | --- |
| Example 1-1 | Mo—40 at % Cr | 3.05 | 4.32 |
| Example 1-2 | Mo—20 at % Cr | 3.10 | 4.39 |
| Example 1-3 | Mo | 3.15 | 4.46 |

Here, $a_3$ is computed from the plane interval $d_{200}$ estimated from the CrMo (200) peak or the Mo (200) peak using $a_3=2\times d_{200}$. In a case in which the fourth under layer (MgO) 105 grows epitaxially so as to be (100)-oriented on the (100)-oriented third under layer (MoCr or Mo) 104, an orientation relationship of CrMo<110>//MgO<100> or Mo<110>//MgO<100> is established in the in-plane direction.

As shown in Table 1, for all $\sqrt{2}a_3$ of the example media (Examples 1-1 to 1-3), it is considered that the lattice constants of MgO are above 4.21 Å, and a tensile stress is exerted in the parallel direction to the film surface in the fourth under layer (MgO) 105.

From the magnetic layer 106, a mixed peak of a $L1_0$-FePt (001) peak, a $L1_0$-FePt (002) peak, and a FCC-FePt (200) peak was observed. The ratios of the former integrated intensity to the latter integrated intensity were all 1.8 or more. The above fact shows that the FePt alloy in the magnetic layer 106 has a $L1_0$-type structure with a high degree of order, and is (001)-oriented. While there is no diffraction peak confirmed from MgO, it is considered that the FePt alloy in the magnetic layer 106 is (100)-oriented from the fact that the FePt alloy shows a strong (001) orientation.

On the other hand, even from the magnetic layer 106 of the comparative example medium (Comparative example 1) in which the third under layer 104 was not formed, similarly to the example media, a mixed peak of a $L1_0$-FePt (001) peak, a $L1_0$-FePt (002) peak, and a FCC-FePt (200) peak was observed. However, the ratio of the former integrated intensity to the latter integrated intensity was approximately 1.3. From the above fact, it was found that, when the third magnetic layer (CrMo or Mo) 104 having a lattice constant of 2.98 Å or more is formed, the degree of order can be significantly improved.

The coercive forces (Hc) of the example media (Examples 1-1 to 1-3) and the comparative example medium (Comparative example 1) are shown in Table 2.

TABLE 2

|  | Third under layer | Hc (kOe) |
| --- | --- | --- |
| Example 1-1 | Mo—40 at % Cr | 15.6 |
| Example 1-2 | Mo—20 at % Cr | 16.5 |
| Example 1-3 | Mo | 17.7 |
| Comparative example 1 | — | 11.8 |

As shown in Table 2, Hc increases as the concentration of Mo in the third under layer 104 increases, and, in a case in which pure Mo was used, a Hc of 17.7 kOe was obtained. This value is a value approximately 6 kOe higher than Hc of the comparative example medium in which the third under layer 104 was not formed. This is considered to be because the example media have a high degree of order in the $L1_0$-FePt alloy.

From the above fact, it was found that, when the third under layer 104 is formed of a CrMo alloy or Mo having a lattice constant of 2.98 Å or more, a heat-assisted magnetic recording medium which has a favorable degree of order and shows a high Hc can be obtained by heating the substrate at 600° C. or lower.

In addition, for the first under layer 102, an amorphous alloy, such as Ni-50 at % Ti, Co-45 at % Ta, Co-50 at % Ti, Cr-55 at % Ti, or Cr-40 at % Ta, may be used instead of a Ni-38 at % Ta alloy. In addition, for the magnetic layer 106 as well, it is possible to use a material obtained by adding 10 mol % to 20 mol % of an oxide, such as $SiO_2$, $TiO_2$, $Cr_2O_3$, $Al_2O_3$, $Ta_2O_5$, $ZrO_2$, $Y_2O_3$, $CeO_2$, MnO, TiO, or ZnO, to the FePt alloy.

Second Example

Figure 3:
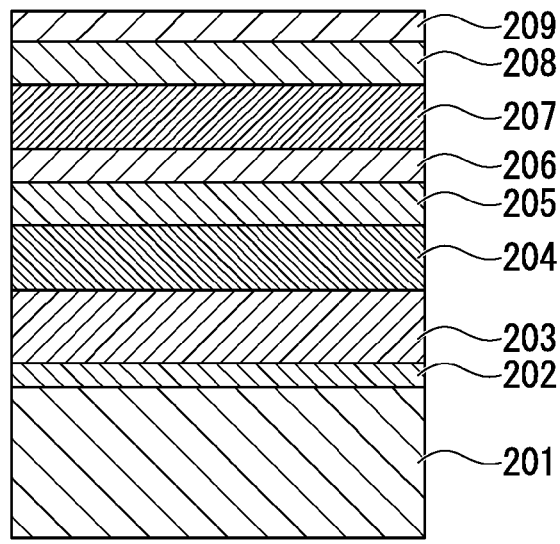
FIG. 3 is a cross-sectional view showing an example of the layer structure of a heat-assisted magnetic recording medium manufactured in a second example.

FIG. 3 shows an example of the layer structure of a heat-assisted magnetic recording medium manufactured in the second example (hereinafter referred to as the example medium).

When the example medium is manufactured, a 5 nm-thick first under layer 202 made of Co-50 at % Ti, a 100 nm-thick soft magnetic under layer 203 made of Co-15 at % Ta-3 at % Zr, a 10 nm-thick second under layer 204 made of Cr-20 at % Ti (Example 2-1), Cr-20 at % Mo (Example 2-2), Cr-30 at % V (Example 2-3), Cr-15 at % Mn (Example 2-4), Cr-15 at % Ru (Example 2-5), Cr-15 at % W (Example 2-6), Cr-15 at % Ti-5 at % B (Example 2-7), Cr-15 at % Mo-10 at % B (Example 2-8), Cr-20 at % V-5 at % B (Example 2-9), Cr-16 at % V-10 at % C (Example 2-10), Cr-25 at % Mn-3 at % B (Example 2-11), Cr-15 at % Mn-10 at % C (Example 2-12), Cr-15 at % Mn-5 at % Si (Example 2-13), Cr-10 at % Ru-8 at % B (Example 2-14), Cr-5 at % Mn-10 at % C (Example 2-15), or Cr-30 at % W-5 at % B (Example 2-16), a 9 nm-thick third under layer 205 made of W, a 2 nm-thick fourth under layer 206 made of MgO, a 10 nm-thick magnetic layer 207 made of (Fe-55 at % Pt)-40 at % $TiO_2$, a 4 nm-thick cap layer 208 made of Co-20 at % Nb-10 at % Zr, and a 3 nm-thick protective layer 209 made of carbon (C) were sequentially laminated and formed on a glass substrate 201. In addition, the substrate is heated twice after formation of the first under layer 202 and after formation of the fourth under layer 206, and the heating temperatures are 180° C. and 450° C., respectively. In addition, as in Comparative example 2, a heat-assisted magnetic recording medium (hereinafter referred to as the comparative example medium) was manufactured by directly forming the third under layer (W) 205 on the first under layer (CoTaZr alloy) 202 without forming the second under layer 204.

As a result of performing the X-ray diffraction measurements of the example media (Examples 2-1 to 2-10), it was found that the Cr alloy used for the second under layer 204 and W used for the third under layer 205 were all (100)-oriented. In addition, the lattice constant obtained from the (200) peak of W used as the third under layer 205 was 3.17 A.

From the magnetic layer 207, a mixed peak of a $L1_0$-FePt (001) peak, a $L1_0$-FePt (002) peak, and a FCC-FePt (200) peak was observed. The values of the ratios of the former integrated intensity to the latter integrated intensity, the coercive forces Hc, and the coercive force dispersion ΔHc/Hc are shown in Table 3.

In addition, ΔHc/Hc was measured using the method described in "IEEE Trans. Magn., vol. 27, pp 4975-4977, 1991". Specifically, for the major loop and the minor loop, the magnetic fields were measured when the values of magnetization became 50% or the saturation value, and ΔHc/Hc was computed from the difference between both magnetic fields with an assumption that the Hc distribution was a Gaussian distribution. ΔHc/Hc is a parameter that corresponds to switching field distribution, and the switching field distribution becomes narrower as the value decreases, and therefore, a favorable medium SNR can be obtained.

TABLE 3

| | Second under layer | Ratio of integrated intensity | Hc (kOe) | ΔHc/Hc |
|---|---|---|---|---|
| Example 2-1 | Cr—20 at % Ti | 1.81 | 17.2 | 0.26 |
| Example 2-2 | Cr—20 at % Mo | 1.88 | 17.4 | 0.27 |
| Example 2-3 | Cr—30 at % V | 1.81 | 17.5 | 0.25 |
| Example 2-4 | Cr—15 at % Mn | 1.83 | 18.1 | 0.28 |
| Example 2-5 | Cr—15 at % Ru | 1.90 | 17.7 | 0.25 |
| Example 2-6 | Cr—15 at % W | 1.82 | 18.2 | 0.24 |
| Example 2-7 | Cr—15 at % Ti—5 at % B | 1.71 | 15.5 | 0.21 |
| Example 2-8 | Cr—15 at % Mo—10 at % B | 1.61 | 15.9 | 0.22 |
| Example 2-9 | Cr—20 at % V—5 at % B | 1.67 | 16.1 | 0.16 |
| Example 2-10 | Cr—16 at % V—10 at % C | 1.62 | 15.8 | 0.18 |
| Example 2-11 | Cr—25 at % Mn—3 at % B | 1.72 | 16.2 | 0.17 |
| Example 2-12 | Cr—15 at % Mn—10 at % C | 1.71 | 16.8 | 0.18 |
| Example 2-13 | Cr—15 at % Mn—5 at % Si | 1.63 | 16.2 | 0.18 |
| Example 2-14 | Cr—10 at % Ru—8 at % B | 1.68 | 16.2 | 0.17 |
| Example 2-15 | Cr—5 at % Ru—10 at % C | 1.72 | 15.5 | 0.19 |
| Example 2-16 | Cr—30 at % W—5 at % B | 1.71 | 15.9 | 0.21 |
| Comparative Example 2 | — | — | 9.2 | 0.33 |

As shown in Table 3, the integrated intensity ratios of the example media (Examples 2-1 to 2-10) were all 1.6 or more. This fact shows that the FePt alloys in the magnetic layers 207 of the example media have a high degree of order. In addition, the reasons why the coercive forces of the example media all show a high value of 15 kOe or more are considered to be as follows.

In addition, the media (Examples 2-7 to 2-16) in which an alloy containing B, C, or Si is used for the second under layer 204 tend to show a low ΔHc/Hc compared to the media (Examples 2-1 to 2-6) in which the above element was not added. Particularly, media in which CrVB, CrVC, CrMnB, or CrRuB was used for the second under layer 204 showed a low ΔHc/Hc of 0.2 or less.

On the other hand, as a result of performing the X-ray diffraction measurement of the comparative example medium (Comparative Example 2), W used for the third under layer 205 did not show a (100) orientation, and was (110)-oriented. In addition, it was found that there was no $L1_0$-FePt (001) peak observed from the magnetic layer 207, and the degree of order of the FePt alloy was not sufficient. Therefore, the medium showed a coercive force of approximately 9 kOe which was very low compared to the example media.

From the above fact, it was found that, when a (100)-oriented Cr alloy is used for the second under layer 203 and the third under layer 205 is formed of W, a heat-assisted magnetic recording medium which has a favorable degree of order of the FePt alloy in the magnetic layer 207 and a high coercive force can be obtained. In addition, it was found that, when CrVB, CrVC, CrMnB, or CrRuB is used for the second under layer 204, particularly, ΔHc/Hc can be decreased.

In addition, for the first under layer 202, it is also possible to use a soft magnetic alloy, such as a CoNbZr alloy, a CoFeTaZr alloy, a CoFeTaB alloy, a CoFeTaSi alloy, a CoFeZrSi alloy, a CoFeZrB alloy, a FeAlSi alloy or a FeTaC alloy, in addition to the CoTaZr alloy. In addition, an adhesion layer may be formed between the glass substrate 201 and the first under layer 202 for the purpose of improving adhesiveness. For the adhesive layer, it is possible to use an amorphous alloy having a favorable adhesiveness with the glass substrate 201, such as a NiTa alloy, a NiTi alloy, a CoTa alloy, a CoTi alloy, a CrTi alloy, or a CrTa alloy.

Third Example

Figure 4:
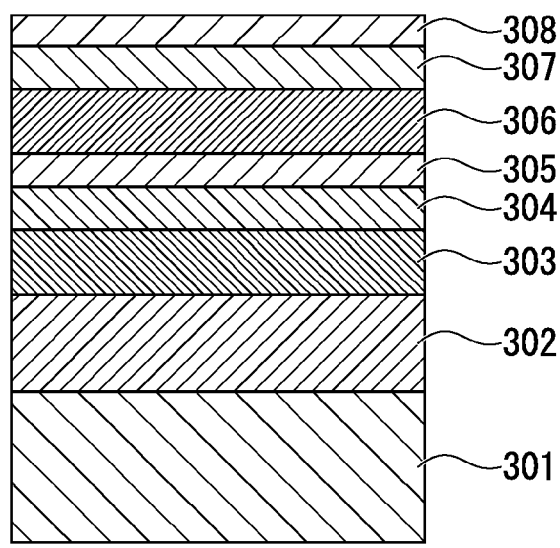
FIG. 4 is a cross-sectional view showing an example of the layer structure of a heat-assisted magnetic recording medium manufactured in a third example.

FIG. 4 shows an example of the layer structure of a heat-assisted magnetic recording medium manufactured in the third example (hereinafter referred to as the example medium). On a glass substrate 301, a 50 nm-thick first under layer 302 made of Co-30 at % Cr-10 at % Zr, a 10 nm-thick second under layer 303 made of Cr-20 at % Mo-5 at % B, a 10 nm-thick third under layer 304 made of V-15 at % Cr (Example 3-1), V-15 at % Ti (Example 3-2), Mo-20 at % Cr (Example 3-3), Mo-30 at % V (Example 3-4), Mo-20 at % Ta (Example 3-5), Mo-10 at % Nb (Example 3-6), Mo-20 at % Ti (Example 3-7), Mo-45 at % W (Example 3-8), W-20 at % Cr (Example 3-9), W-20 at % V (Example 3-10), W-30 at % Ta (Example 3-11), W-25 at % Nb (Example 3-12), W-30 at % Ti (Example 3-13), Ta-20 at % Cr (Example 3-14), Ta-30 at % V (Example 3-15), Ta-25 at % Ti (Example 3-16), Ta-20 at % Zr (Example 3-17), Ta-30 at % Nb (Example 3-18), Mo (Example 3-19), or W (Example 3-20), a 1.5 nm-thick fourth under layer 305 made of MgO, a 6 nm-thick magnetic layer 306 made of (Fe-55 at % Pt)-8 mol % $SiO_2$-4 mol % $Cr_2O_3$, a 3 nm-thick cap layer 307 made of Fe-15 at % Al-3 at % Si, and a 3.2 nm-thick protective layer 308 made of carbon (C) were sequentially laminated and formed. In addition, the substrate is heated twice after formation of the first under layer 302 and after formation of the fourth under layer 305, and the heating temperatures are 180° C. and 450° C., respectively. In addition, after the first under layer (CoCrZr alloy) 302 was formed, an Ar+1% $O_2$ gas at 1 Pa was introduced into a chamber, and the surface of the first under layer 302 was oxidized.

In addition, as Comparative Example 3, a heat-assisted magnetic recording medium (hereinafter referred to as the comparative example medium) was manufactured by directly forming the third under layer 304, which corresponds to the respective Examples 3-1 to 3-20, on the first under layer (CoCrZr alloy) 302 without forming the second under layer 303.

As a result of performing the X-ray diffraction measurements of the example media (Examples 3-1 to 3-20), the CrTiB alloy used for the second under layer 303 was (100)-oriented. In addition, the third under layer 304 also had a BCC structure, and was (100)-oriented. The lattice constants of the third under layers 304 estimated from the (200) peaks were all 2.98 Å or more. A strong $L1_0$-FePt (001) peak was observed from the magnetic layer 306, and it was found that the FePt alloy had an $L1_0$ structure having a high degree of order.

On the other hand, the third under layer 304 of the comparative example medium did not show a (100) orientation, and was (110)-oriented. In addition, a $L1_0$-FePt (001) peak was not observed from the magnetic layer 306.

The coercive forces (Hc) of the example media (Examples 3-1 to 3-20) are shown in Table 4.

TABLE 4

| | Third under layer | Hc (kOe) |
|---|---|---|
| Example 3-1 | V—15 at % Cr | 16.2 |
| Example 3-2 | V—15 at % Ti | 15.5 |
| Example 3-3 | Mo—20 at % Cr | 15.7 |
| Example 3-4 | Mo—30 at % V | 16.3 |
| Example 3-5 | Mo—20 at % Ta | 15.7 |
| Example 3-6 | Mo—10 at % Nb | 15.1 |
| Example 3-7 | Mo—20 at % Ti | 15.2 |
| Example 3-8 | Mo—45 at % W | 16 |
| Example 3-9 | W—20 at % Cr | 15.9 |
| Example 3-10 | W—20 at % V | 16.8 |
| Example 3-11 | W—30 at % Ta | 15.9 |
| Example 3-12 | W—25 at % Nb | 16.1 |
| Example 3-13 | W—30 at % Ti | 16.4 |
| Example 2-14 | Ta—20 at % Cr | 16.6 |
| Example 3-15 | Ta—30 at % V | 15.4 |
| Example 3-16 | Ta—25 at % Ti | 16.7 |
| Example 3-17 | Ta—20 at % Zr | 17.2 |
| Example 3-18 | Ta—30 at % Nb | 16.7 |
| Example 3-19 | Mo | 18.1 |
| Example 3-20 | W | 18.5 |

As shown in Table 4, all example media show a high coercive force of 15 kOe or more. This is considered to be because the FePt alloy in the magnetic layer 306 has a $L1_0$ structure having a high degree of order as described above. Particularly, the media in which Mo or W are used for the third under layer 304 show a high coercive force.

On the other hand the coercive force of the comparative example medium in which the second under layer 303 was not formed was as low as 10 kOe or less (not shown in Table 4). This is considered to be because the third under layer 303 directly formed on the first under layer (CoCrZr alloy) 302 did not show a (100) orientation such that the degree of order of the FePt alloy in the magnetic layer 306 was not sufficient.

From the above fact, it was found that, when a (100)-oriented Cr alloy is used for the second under layer 303, and the third under layer 304 having a BCC structure with a lattice structure of 2.98 Å or more is formed on the second under layer 303, a heat-assisted magnetic recording medium showing a favorable degree of order and a high coercive force can be obtained by heating the substrate at a temperature of 500° C. or lower.

In addition, an alloy layer which contains Al, Cu, Ag, and the like as principle components and has a high heat conductivity may be formed below the first under layer 302 as a heat sink layer.

Fourth Example

In the fourth example, a heat-assisted magnetic recording medium (hereinafter referred to as the example medium) having the same configuration as the example medium shown in FIG. 4 except that 10 nm-thick Mo-20 at % W (Example 4) was used for the third under layer 304 was manufactured. In addition, as Comparative Example 4, a heat-assisted magnetic recording medium (hereinafter referred to as the comparative example medium) was manufactured by directly forming the 10 nm-thick third under layer 304 made of Mo-20 at % W on the first under layer 302 without forming the second under layer 303. The film thicknesses of the respective layers other than the above were the same as the example media of the third example, but only the film thickness of the fourth under layer (MgO) 305 was changed to 1 to 5 nm.

Figure 5:
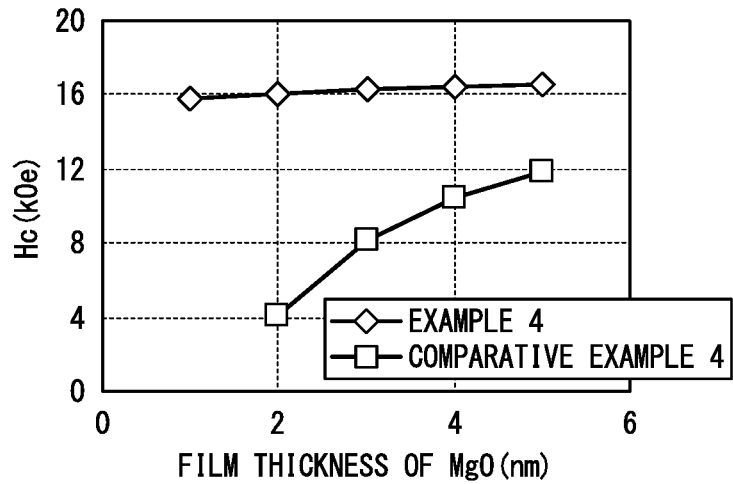
FIG. 5 is a graph showing the relationships between the coercive force (Hc) and the film thickness of MgO of an example medium and a comparative example medium which are manufactured in a fourth example.

The relationships between the coercive force (Hc) and the film thickness of MgO of the example medium (Example 4) and the comparative example medium (Comparative example 4) are shown in FIG. 5.

As shown in FIG. 5, the coercive force of the example medium (Example 4) is higher than the coercive force of the comparative example medium (Comparative example 4), and a high coercive force is maintained even when MgO is made to be as thin as 1 nm. In contrast to the above, in the comparative example medium (Comparative example 4), the film thickness of MgO decreased, and the coercive force abruptly decreased. Since the film thickness of the third under layer 304 was as thin as 5 nm, it was difficult to estimate the lattice constant using an X-ray diffraction measurement. However, since the MoW alloy is fully a solid solution system, from the Vegard's Law, the lattice constant of the Mo-20 at % W alloy is estimated to be approximately 3.15 A.

From the above fact, it was found that, when the third under layer 304 having a BCC structure with a lattice constant of 2.98 Å or more is formed, a heat-assisted magnetic recording medium showing a high coercive force can be obtained even when the film thickness of the fourth under layer (MgO) 305 formed on the third under layer is made to be as thin as 5 nm or less.

In addition, for the third under layer 304, the lattice constant becomes 2.98 Å or more. Even in a case in which VCr, VTi, MoCr, MoTi, MoV, MoMn, MoRu, MoW, MoTa, MoNb, WCr, WTi, WV, WMn, WRu, WTa, WNb, TaCr, TaTi, TaZr, TaNb, NbCr, NbTi, NbZr, or the like is used, the same effects can be obtained.

Fifth Example

Figure 6:
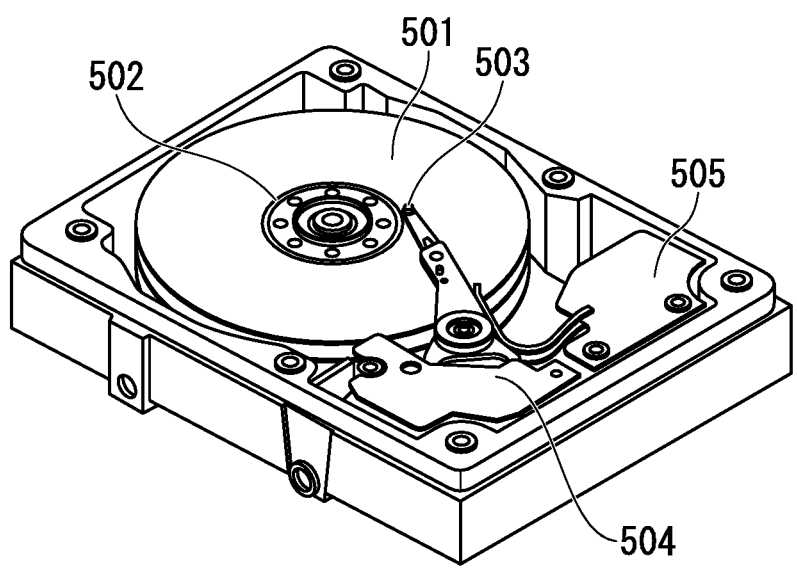
FIG. 6 is a perspective view showing an example of the configuration of a magnetic recording and reading apparatus used in a fifth example.

In the fifth example, a perfluoropolyether lubricant was coated on the surfaces of the heat-assisted magnetic recording media manufactured in the first to fourth examples, and then the heat-assisted magnetic recording media were embedded in a magnetic recording and reading apparatus as shown in FIG. 6. The magnetic recording and reading apparatus is schematically constituted by a heat-assisted magnetic recording medium 501, a medium driving portion 502 for rotating the heat-assisted magnetic recording medium, a magnetic head 503 that performs a recording operation and a reading operation with respect to the heat-assisted magnetic recording medium 501, a head driving portion 504 for moving the magnetic head 503 relative to the heat-assisted magnetic recording medium 501, and a recording and reading signal processing system 505 for performing signal input from the magnetic head 503 and reading of output signals from the magnetic head 503. In addition, in the magnetic recording and reading apparatus, while not shown in FIG. 6, a laser generation apparatus that generates laser light and a waveguide for transmitting the generated laser light to the magnetic head 503 are disposed.

Figure 7:
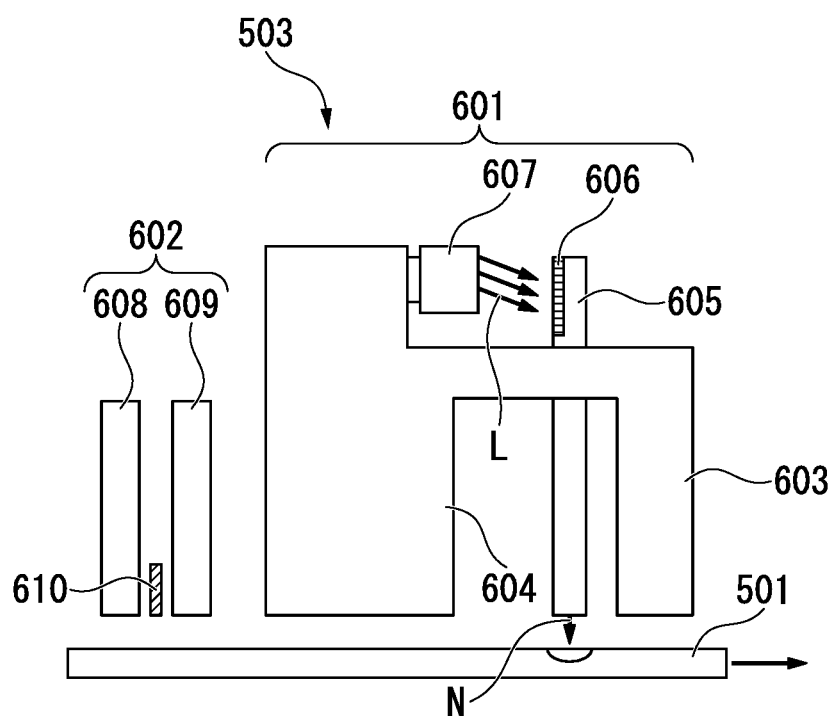
FIG. 7 is a perspective view schematically showing an example of the configuration of a magnetic head included in the magnetic recording and reading apparatus shown in FIG. 6.

In addition, the structure of the magnetic head 503 embedded in the magnetic recording and reading apparatus is schematically shown in FIG. 7. The magnetic head 503 has a recording head 601 and a reading head 602, and the recording head 601 is constituted by a principle magnetic pole 603, an auxiliary magnetic pole 604, and a planar solid immersion mirror (PSIM) 605 sandwiched therebetween. As the PSIM 605, it is possible to use a mirror having the structure as described in, for example, "Jpn., J. Appl. Phys., Vol 145, no. 2B, pp 1314-1320 (2006)". The recording head 601 radiates laser light L having a wavelength of 650 nm, which is emitted from a laser light source 607 such as a laser diode, to a grading portion 606 of the PSIM 605, and recording is performed using near-field light NL generated from the front end portion (near-field light generating portion) of the PSIM 605 while heating the heat-assisted magnetic recording medium 501. In addition, the reading head 602 is constituted by a TMR element 610 sandwiched between a top shield 608 and a bottom shield 609.

As a result of heating the heat-assisted magnetic recording medium 501 using the magnetic head 503, performing recording at a track recording density of 1800 kFCl (kilo Flux changes per Inch), and measuring an electromagnetic conversion characteristic, a high medium SN ratio of 15 dB or more and favorable overwriting characteristics could be obtained. In addition, the heat-assisted magnetic recording medium of the second example in which the soft magnetic alloy is formed exhibited particularly favorable overwriting characteristics.

In addition, in the present example, the waveguide and the near-field light generating portion are disposed on the reading side of the principle magnetic pole 603, but the waveguide and the near-field light generating portion can also be disposed on the trailing side of the principle magnetic pole 603. In addition, the waveguide and the near-field light generating portion may also be disposed between the recording head 601 and the reading head 602.

It is possible to provide a heat-assisted magnetic recording medium which has a low ordering temperature and enables the film thickness of the MgO under layer to be decreased to 5 nm or less.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A heat-assisted magnetic recording medium comprising:
   a substrate;
   an under layer formed on the substrate; and
   a magnetic layer formed on the under layer,
   wherein the magnetic layer includes an alloy having a $L1_0$ structure as a principle component, and
   the under layer is constituted by a first under layer made of an amorphous alloy or an alloy having a microcrystalline structure, a second under layer made of Cr or an alloy which contains Cr as a principle component and has a BCC structure, a third under layer made of a metal or an alloy having a BCC structure with a lattice constant of 2.98 Å or more, and a fourth under layer made of MgO.

2. The heat-assisted magnetic recording medium according to claim 1,
   wherein the first under layer is made of a NiTa alloy, a NiTi alloy, a CoTa alloy, a CoTi alloy, a CrTa alloy, a CrTi alloy, a CoCrZr alloy, or a CoCrTa alloy which is non-magnetic or is magnetized at 100 emu/cc or less.

3. The heat-assisted magnetic recording medium according to claim 1,
   wherein the second under layer is made of an alloy which contains Cr as a principle component and contains at least one element selected from Ti, V, Mo, W, Ru, and Mn.

4. The heat-assisted magnetic recording medium according to claim 1,
   wherein the second under layer is made of an alloy which contains Cr as a principle component, contains at least one element selected from Ti, V, Mo, W, Ru, and Mn, and contains at least one element selected from B, Si, and C.

5. The heat-assisted magnetic recording medium according to claim 1,
   wherein a lattice constant of the second under layer is 2.98 Å or less.

6. The heat-assisted magnetic recording medium according to claim 1,
   wherein the third under layer is made of an alloy which contains at least one element selected from V, Mo, W, Ta, and Nb.

7. The heat-assisted magnetic recording medium according to claim 1,
   wherein the third under layer is made of an alloy which contains at least one element selected from V, Mo, W, Ta, and Nb, and contains at least one element selected from Cr, Mn, Ru, and Ti.

8. The heat-assisted magnetic recording medium according to claim 1,
   wherein the third layer is made of a metal of Mo or W.

9. The heat-assisted magnetic recording medium according to claim 1,
   wherein the lattice constant of the third under layer is larger than the lattice constant of the second under layer.

10. The heat-assisted magnetic recording medium according to claim 1,
wherein an under layer made of a soft magnetic alloy which contains Co or Fe as a principle component and contains at least one selected from Ta, B, Si, Zr, Al, and C is formed between the first under layer and the second under layer, or is formed between the substrate and the first under layer.

11. The heat-assisted magnetic recording medium according to claim 1,
wherein the magnetic layer is made of an alloy which contains a FePt alloy or a CoPt alloy having a $L1_0$ structure as a principle component and contains at least one oxide selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO and C or a chemical element.

12. The heat-assisted magnetic recording medium according to claim 1, comprising:
a cap layer formed on the magnetic layer,
wherein the cap layer is made of an alloy which contains Co, Ni, or Fe as a principle component and has a lower magnetic anisotropy than the magnetic layer.

13. A magnetic recording and reading apparatus comprising:
the heat-assisted magnetic recording medium according to claim 1,
a medium driving portion that drives the heat-assisted magnetic recording medium in a recording direction,
a magnetic head which has a laser generation portion that heats the heat-assisted magnetic recording medium and a waveguide that guides laser light generated from the laser generation portion to a front end portion, and performs a recording operation and a reading operation on the heat-assisted magnetic recording medium,
a head moving portion that moves the magnetic head relative to the heat-assisted magnetic recording medium, and
a recording and reading signal processing system for performing signal input into the magnetic head and reading of an output signal from the magnetic head.

\* \* \* \* \*